(12) United States Patent
Goldberg

(10) Patent No.: US 10,030,682 B2
(45) Date of Patent: Jul. 24, 2018

(54) TWO-PART FASTENER

(71) Applicant: FORD GLOBAL TECHNOLOGIES, LLC, Dearborn, MI (US)

(72) Inventor: Ira Jason Goldberg, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 577 days.

(21) Appl. No.: 14/467,237

(22) Filed: Aug. 25, 2014

(65) Prior Publication Data
US 2016/0053795 A1    Feb. 25, 2016

(51) Int. Cl.
F16B 19/10    (2006.01)
(52) U.S. Cl.
CPC .................. F16B 19/1081 (2013.01)
(58) Field of Classification Search
CPC ................................... F16B 19/1081
USPC ......................................... 411/45–48
See application file for complete search history.

(56) References Cited

U.S. PATENT DOCUMENTS

| | | | |
|---|---|---|---|
| 4,637,765 A | | 1/1987 | Omata |
| 4,832,547 A | * | 5/1989 | Shiraishi ................. B60R 19/22 411/39 |
| 4,840,523 A | * | 6/1989 | Oshida ................ F16B 19/1081 411/48 |
| 4,927,287 A | * | 5/1990 | Ohkawa ................ F16B 21/086 24/297 |
| 4,952,106 A | * | 8/1990 | Kubogochi ......... F16B 19/1081 411/48 |
| 5,085,545 A | * | 2/1992 | Takahashi ........... F16B 19/1027 411/45 |
| 5,201,623 A | | 4/1993 | Benedetti et al. |
| 6,039,523 A | * | 3/2000 | Kraus ................... F16B 5/0628 411/48 |
| 6,726,417 B2 | * | 4/2004 | Kanie ................. F16B 19/1081 411/41 |
| 2013/0287517 A1 | | 10/2013 | Fujiwara |

FOREIGN PATENT DOCUMENTS

| | | |
|---|---|---|
| GB | 2173851 A | 10/1986 |
| JP | 2007056895 A | 3/2007 |
| JP | 2009191971 A | 8/2009 |

OTHER PUBLICATIONS

NIFCO, Push Rivet, http:www.nifco.co.jp/ctl/fas/fastener-panel/push_rivet.html, dated Oct. 9, 2014, pp. 1-2.

* cited by examiner

*Primary Examiner* — Flemming Saether
(74) *Attorney, Agent, or Firm* — LeClairRyan

(57) ABSTRACT

A fastener with a central longitudinal axis, including a grommet including a leg portion which ends with a toe portion, and a pin including a head portion, a tail portion and a body portion, the head and tail portions each having an outer circumference greater than a maximum outer circumference of the body portion, the body portion including a first shoulder defined by first and second beveled surfaces and a first end surface positioned there between, and a second shoulder defined by third and fourth beveled surfaces and a second end surface positioned there between, the first and third beveled surfaces are of different angles relative to the central longitudinal axis, the second and fourth beveled surfaces are of different angles relative to the central longitudinal axis.

19 Claims, 3 Drawing Sheets

US 10,030,682 B2

TWO-PART FASTENER

TECHNICAL FIELD

The disclosed inventive concept relates generally to a fastener, and in particular a two-part fastener including a pin and a grommet.

BACKGROUND

Fasteners have been widely used to secure or connect two or more parts in various applications including automotive industry.

U.S. Pat. No. 5,201,623 discloses a two stage rivet including a pin for engagement with a grommet, wherein the pin is provided with an enlarged central portion.

U.S. Pub. No. US 2013/0287517A1 provides another disclosure of a two piece clip including a grommet and a pin.

SUMMARY

One or more embodiments of the present invention relates to a two-part fastener positioned for relatively more reliable installation and greater service availability.

According to one aspect of the present invention, a fastener is provided to include a grommet having a leg portion, and a pin having a head portion, a tail portion and a body portion, the body portion being positioned between the head and tail portions and for contacting the leg portion at first and second operating positions, the head and tail portions each having an outer circumference greater than a maximum outer circumference of the body portion.

According to another aspect of the present invention, a fastener with a central longitudinal axis is provided to include a grommet having a leg portion which ends with a toe portion, and a pin having a head portion, a tail portion and a body portion, the body portion having a first shoulder defined by first and second beveled surfaces and a second shoulder defined by third and fourth beveled surfaces, the second and fourth beveled surfaces are of different angles relative to the central longitudinal axis.

According to yet another aspect of the present invention, a fastener with a central longitudinal axis is provided to include a grommet having a leg portion which ends with a toe portion, and a pin having a head portion, a tail portion and a body portion, the head and tail portions each having an outer circumference greater than a maximum outer circumference of the body portion, the body portion having a first shoulder defined by first and second beveled surfaces and a first end surface positioned there between, and a second shoulder defined by third and fourth beveled surfaces and a second end surface positioned there between, the first and third beveled surfaces are of different angles relative to the central longitudinal axis, the second and fourth beveled surfaces are of different angles relative to the central longitudinal axis.

One or more advantageous features as described herein will be readily apparent from the following detailed description of one or more embodiments when taken in connection with the accompanying drawings.

BRIEF DESCRIPTION OF THE DRAWINGS

For a more complete understanding of one or more embodiments of the present invention, reference should now be made to the one or more embodiments illustrated in greater detail in the accompanying drawings and described below wherein.

DETAILED DESCRIPTION OF ONE OR MORE EMBODIMENTS

Figure 1:
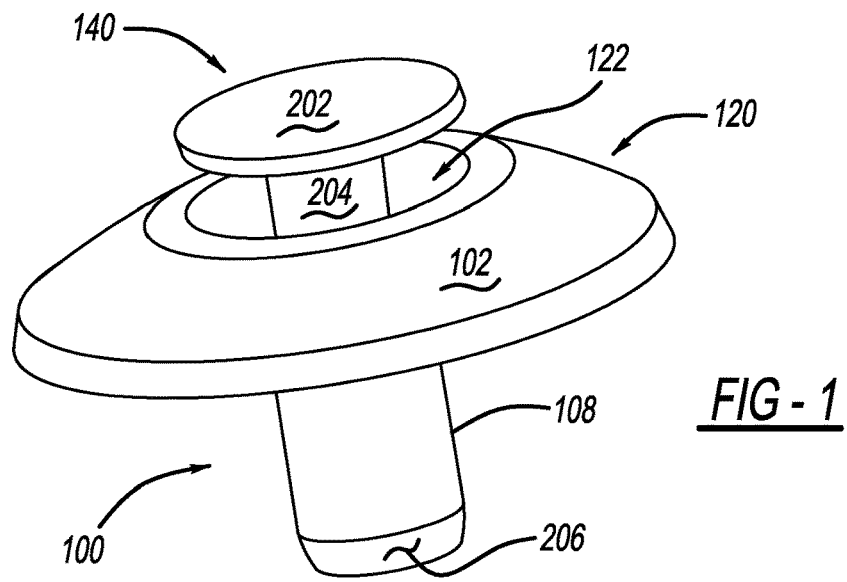
FIG. 1 illustratively depicts a perspective view of a fastener according to one or more embodiments of the present invention.

As referenced in the figures, the same reference numerals are used to refer to the same components. In the following description, various operating parameters and components are described for different constructed embodiments. These specific parameters and components are included as examples and are not meant to be limiting.

In one or more embodiments, the present invention is advantageous in at least providing a two-stage push style rivet fastener with an enlarged head and an optional enlarged tail relative to a body, the body having first and second shoulders designed with different axial surface angles such that accidental and/or unwanted disengagement from an installed position to a service position or a pre-install position may be prevented. In addition, the enlarged head and tail further prevent the pin from any over-insertion into or disengagement from the grommet. All of these features help secure an enhanced serviceability of the rivet fastener when service timing is of the essence.

FIG. 1 illustratively depicts a perspective view of a fastener generally shown at 100 according to one or more embodiments of the present invention, which includes a grommet 120 defining an opening 122 and a pin 140 partially received within the opening 122. The grommet 120 includes a support portion 102 and a leg portion 108. The pin 140 includes a head portion 202, a tail portion 206 and a body portion 204 positioned between the head and tail portions 202, 206.

Figure 2A:
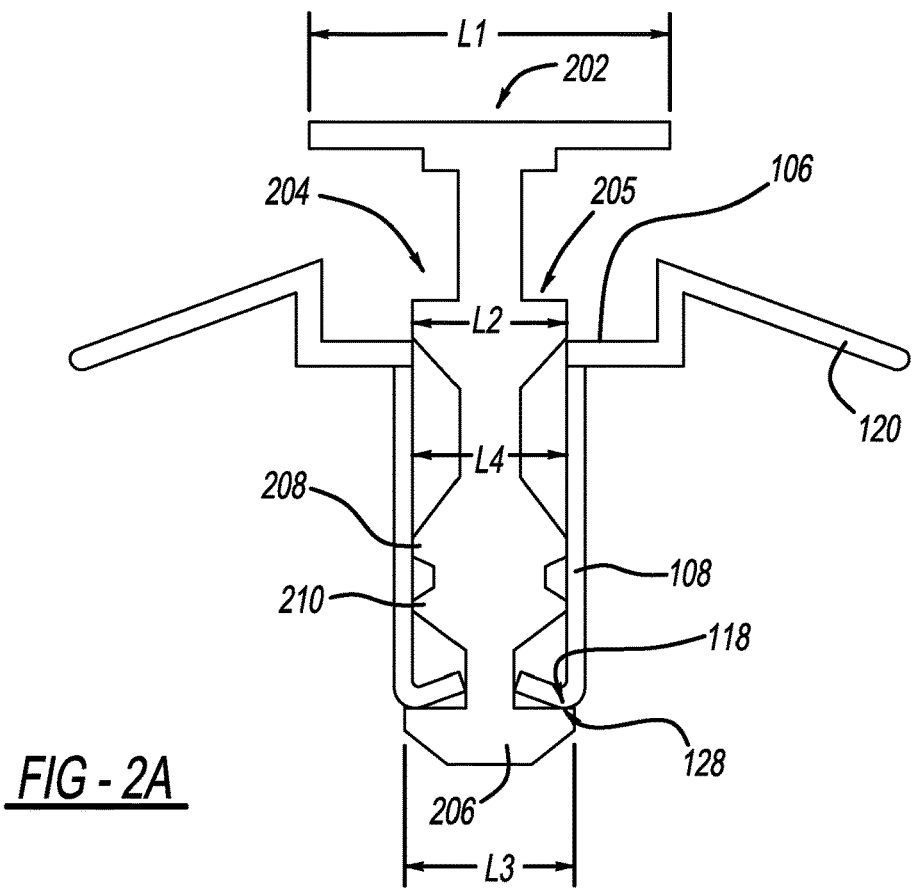
FIG. 2A illustratively depicts a cross-sectional view of the fastener referenced in FIG. 1, while being in a pre-installed position.

FIG. 2A illustratively depicts a cross-sectional view of the fastener 100 referenced in FIG. 1, while being in a first, pre-installed position. The head portion 202 and the tail portion 206 each have an outer circumference greater than a maximum outer circumference of the body portion 204. The term "circumference" is employed herein to refer to a linear distance around the edge of a closed curve of a shape which may be a circle, an oval, a square, a rectangle, or any other suitable shape. This configuration is believed to be beneficial to reduce and eliminate the undesirable possibility in which the head portion 202 is accidentally pushed inwardly or downwardly through the opening 122 or that the body portion 204 along with the tail portion 206 is accidentally pulled outwardly or upwardly to be completely disengaged from the opening 122. This configuration may be realized when a cross-sectional linear dimension "L1" of the head portion 202 and a cross-sectional linear dimension "L3" of the leg portion 206 are each greater than a cross-sectional linear dimension "L2" of the body portion 204. Alternatively this configuration may be realized when both "L1" and "L3" are greater than a cross-sectional linear dimension "L4" of the opening 122.

The pin 140 and the grommet 120, in each of its entirety or any portion thereof, may be of any suitable shape and dimension. For the mere purpose of brevity, the pin 140 and the grommet 120 are depicted in the shape of a circle or an oval.

Additionally as shown in FIG. 2A, the pin 200 may further include a rib portion 205 to prevent the leg portion 108 from unnecessary collapsing. The rib portion 205 is positioned downstream of the head portion 202 and likely in the vicinity of the support portion 102 of the grommet 120 such that the opening 122 defined by the support portion 102 and the leg portion 108 is effectively prevented from unwanted collapsing with the employment of the rib portion 205.

Referring back to FIG. 2A, the body portion 204 includes a first shoulder 208 and a second shoulder 210 positioned next to each other, and both being receivable within the opening 122. In this pre-installment positioned as illustratively depicted in FIG. 2A, a toe portion 118 of the leg portion 108 may be supported on the tail portion 206. Conversely, the tail portion 206 is prevented from being accidentally disengaged from the grommet 120 via a direct contact with and favorable resistance from the toe portion 118. In certain embodiments, and in view of FIG. 2A, the direct contact is realized via a contact area 128, which includes the farthest or the most distal point (not shown) on the leg portion 108 away from the support portion 102. In this configuration, the contact area 128 presents a convex outer surface of the toe portion 118.

Figure 2B:
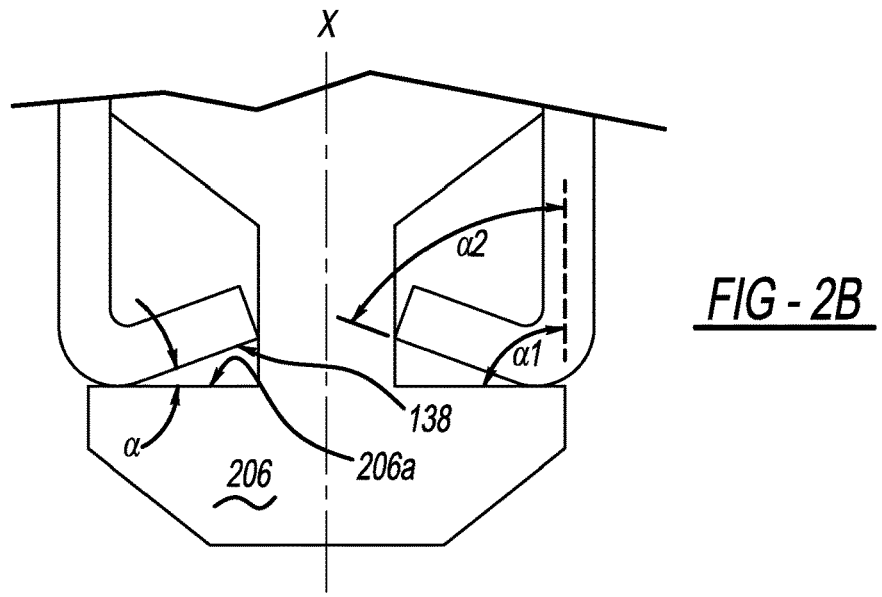
FIG. 2B illustratively depicts an enlarged sectional view of the fastener referenced in FIG. 2A.

In certain embodiments, and further in view of FIG. 2B, the tail portion 206 includes a tail surface 206a and the leg portion 108 includes a toe surface 138, the two surfaces 206a and 138 on a given cross-section such as the cross-section shown in FIG. 2B defines an angle "α", and the angle α is an acute angle.

Optionally, the acute angle α may further refer to an angle difference between angle α1 and angle α2, wherein angle α1 is defined by the tail surface 206a in view of the central longitudinal axis "X"; and angle α2 is defined by the toe surface 138 in view of the central longitudinal axis "X". In certain embodiments, the angle α or the angle difference between a1 and α2 is no greater than 25 degrees, 20 degrees, or 15 degrees. This is beneficial at least because the tail portion 206 of the pin 140 may come in contact with the toe portion 118 via relatively greater surface area rather than a single sharp edge that may deform and become permanently splayed out over time.

The benefit may be further enhanced when the angle α is no greater than 10 degrees, 5 degrees, or 1 degree. This is when a maximum possible contact is realized between surfaces from the tail portion 206 and the toe portion 118. When in this position, the tail portion 206 becomes a flat bezel which provides a surface that is sufficiently parallel to the contact surface 138 of the toe portion 118. Accordingly, the tail portion 206 in the form of a flat bezel is to further reduce any unwanted separation between the pin 140 and the grommet 120. This is beneficial as there is now greater surface area for the bottom of the pin to contact, rather than a single sharp edge that can deform and become permanently splayed out over time. The benefit would be a hard stop that prevents the bottom of the pin 140 from being pushed past the bottom of the grommet 120, and separating the pin 140 and the grommet 120 prematurely or unnecessarily.

Moreover, operating force required to push the pin 140 into the grommet 120 may be controlled such that accidental discharge or release of the pin 140 from the grommet 120 may be effectively prevented via the relatively greater contact surface. In instances where a fastening project comes with a demand for strict time allowance, unwanted disengagement of component of a fastener such as disengagement of the pin 140 from the grommet 120 is probably the last thing an operator wants to deal with. The present design helps address that situation.

Figure 3:
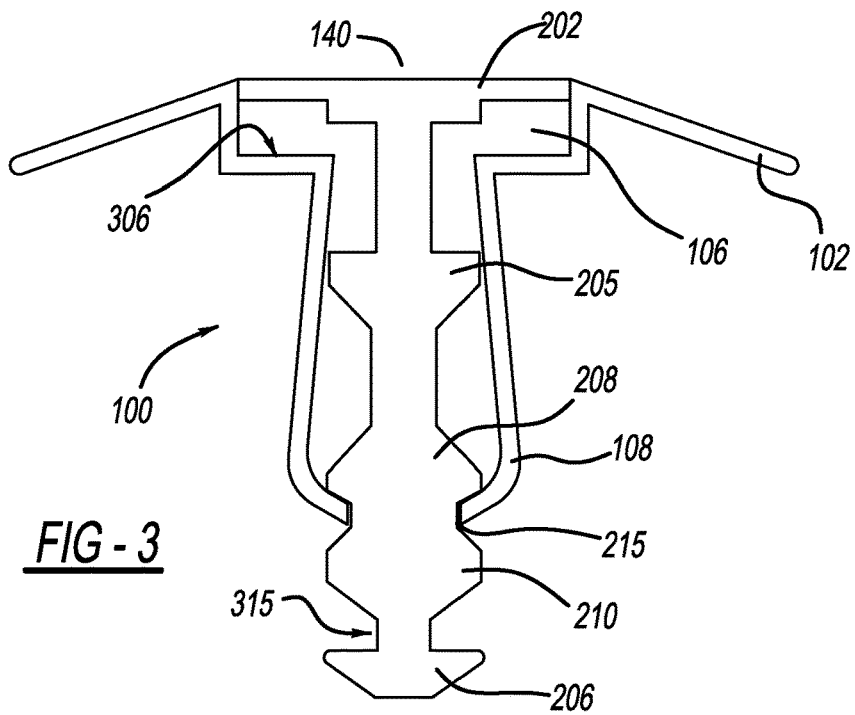
FIG. 3 illustratively depicts a cross-sectional view of the fastener referenced in FIG. 1, while being in an installed position.

FIG. 3 illustratively depicts a cross-sectional view of the fastener 100 referenced in FIG. 1, while being in an installed position. From the pre-installment position shown in FIG. 2A, the pin 140 is pushed toward the toe portion 118 of the grommet 120. As a result of the downward push, the toe portion 118 along with the rest portion of the leg portion 108 moves relatively upward. During the upward movement, the toe portion 118 moves beyond the second shoulder 210 and to arrive at a first neck 215 defined between the first and second shoulders 208, 210. In one non-limiting example, the first neck 215 has a larger circumference than a second neck 315 between the tail portion 206 and the second shoulder 210. By resting the leg portion 108 in the first neck 215, the leg portion 108 is now forced to deform and expand outwardly away from the common longitudinal axis "X" at the installed position.

Figure 4:
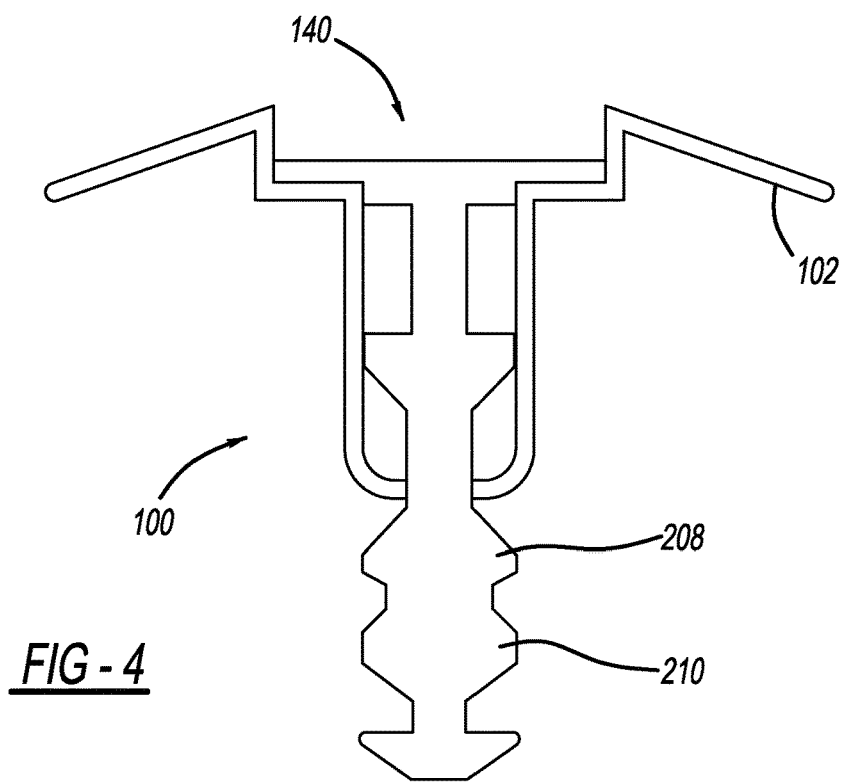
FIG. 4 illustratively depicts a cross-sectional view of the fastener referenced in FIG. 1, while being in a service position.

In addition, and as illustratively depicted in FIG. 4, the head portion 202 of the pin 140 is received through a recess 106 and stopped via a floor 306 of the recess 106, wherein both the recess 106 and its floor 306 are defined by the support portion 102 and the leg portion 108 of the grommet 120 to avoid unintentional touch/push of the head portion 202 of the pin during usage.

FIG. 4 illustratively depicts a cross-sectional view of the fastener 100 referenced in FIG. 1, while being in a third, service position. As shown in FIG. 4, the pin 140 is pushed further from the installed position shown in FIG. 3 such that the leg portion 108 of the grommet 120 has left the first neck 215 and passed the first shoulder 208 to rest in an area between the first shoulder 208 and the head portion 202 of the pin 140. In this service position, the leg portion 108 returns back to a less deformed or its initial state.

Figure 2C:
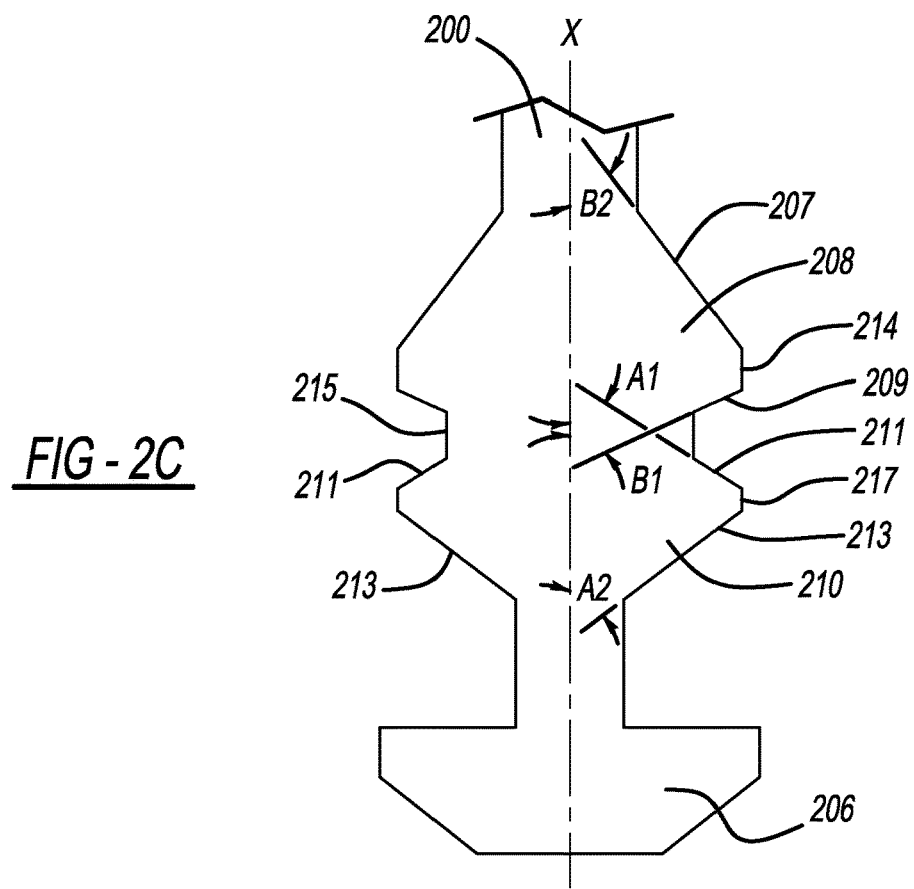
FIG. 2C illustratively depicts another enlarged sectional view of the fastener referenced in FIG. 2A.

FIG. 2C illustratively depicts an enlarged view of the first shoulder 208 and the second shoulder 210 of the pin 140 as illustratively depicted in FIG. 2A, FIG. 3 and FIG. 4. The first shoulder 208 is depicted to include and so is defined by a first beveled surface 207 and a second beveled surface 209. The first and second beveled surfaces 207, 209 may both come to a first stop end 214. In certain embodiments, the first stop end 214 may be reduced to a line instead of a visible area. When constructed as an area, the first stop end 214 is believed to help reduce wearing of the leg portion 108 when the latter moves across the first shoulder 208.

In certain embodiments, the first and second beveled surfaces 207 and 209 may adopt any suitable surface modifications. For instance, the first beveled surface 207 and/or the second beveled surface 209 may in part include a concave shape or a convex shape, or may include certain roughness to impart enhanced friction. Enhanced friction may be applied to modify force desirable to strike a balance between easiness to move the pin 140 relative to the grommet 120 and deterrence against unwanted movement between operating positions.

The second shoulder 210 may include surfaces such as surfaces 211, 213 and 217 and perform functions similar to those relative to the first shoulder 208.

In a non-limiting example and as is illustratively shown in FIG. 2C, the first beveled surface 207, the second beveled surface 209, the third beveled surface 211 and the fourth beveled surface 213 each respectively forms an acute surface angle with the central longitudinal axis "X", namely B2, A1, B1, A2 as shown.

In certain instances, the shoulders 208 and 210 are designed such that the surface angle A1 is less acute than the surface angle A2, or that A1>A2. Without being limited to any particular theory, the value of the surface angle A1 is believed to be closely related to an amount of force needed to move the pin 140 from an installed position such as shown in FIG. 3 to a service position such as shown in FIG. 4. The value of the surface angle A2 is believed to be closely related to an amount of force needed to move the pin 140 from a preinstalled position such as shown in FIG. 2A to an installed position such as shown in FIG. 3. When A1 is greater than A2, additional force may be exerted to move the pin 140 from the installed position to the service position, and accordingly accidental transition from the installed position to the service positioned may be avoided.

In certain instances, and in view of FIG. 2C, the surface angle B1 is greater in value than the surface angle B2, or B1>B2. Without being limited to any particular theory, the value of the surface angle B1 is believed to be closely related to an amount of force needed to move the pin 140 from an installed position such as shown in FIG. 3 to a pre-installed position such as shown in FIG. 2A. The value of the surface angle B2 is believed to be closely related to an amount of force needed to move the pin 140 from a service position such as shown in FIG. 4 to an installed position such as shown in FIG. 3. When B1 is greater than B2, additional force may need to be exerted to move the pin 140 from the service position back to the installed position, and accordingly accidental transition from the service position back to the installed position may be avoided.

In certain embodiments, and as illustratively depicted in FIG. 2C, the surface angle A1 formed between the second beveled surface 209 and the central longitudinal axis X substantially equals to the surface angle B1 formed between the third beveled surface 211 and the central longitudinal axis X. Accordingly this design is beneficial at least in that respective forces needed to push down and pull up the pin 140 pass the first neck 215 are of substantially the same level of difficulty or easiness. Again, accidental or unwanted movement of the pin 140 relative to the grommet 120 is further reduced.

In certain embodiments, the pin 140 is positioned for axial rotation at any one of the installed position, the service position and the pre-installed position. In particular, the pin 140 is provided with a smooth, cylindrical body from the head portion 202 of the pin 140 to where the diameter of the pin begins to change. This allows for axial motion through the grommet 120 to be constrained, while also allowing for the pin 140 to freely rotate within the grommet 120. This allows for ease of use as the possibility of misalignment between the pin 140 and the grommet 120 may be effectively reduced.

In one or more embodiments, the disclosed invention as set forth herein provides a pin-and-grommet type of fastener, that is believed to be advantageous wherein various operating positions may be obtained with relatively greater certainty, reliability and convenience. However, one skilled in the art will readily recognize from such discussion, and from the accompanying drawings and claims that various changes, modifications and variations can be made therein without departing from the true spirit and fair scope of the invention as defined by the following claims.

What is claimed is:

1. A fastener comprising:
   a grommet including a leg portion; and
   a pin including a head portion, a tail portion and a body portion, the body portion being positioned between the head and tail portions and for contacting the leg portion at first and second operating positions, the head and tail portions each having an outer circumference greater than a maximum outer circumference of the body portion, wherein the body portion includes a first shoulder and a second shoulder positioned between the first shoulder and the tail portion along a longitudinal direction, the first shoulder including first and second beveled surfaces, the second shoulder including third and fourth beveled surfaces with the third beveled surface positioned between the second and fourth beveled surfaces along the longitudinal direction, the second beveled surface being less parallel to the longitudinal direction than the fourth beveled surface.

2. The fastener of claim 1, wherein the leg portion of the grommet ends with a toe portion having a convex surface.

3. The fastener of claim 2, wherein the tail portion includes a tail surface, the convex surface of the leg portion contacts the tail surface of the tail portion at a third operating position.

4. The fastener of claim 3, wherein the convex surface of the leg portion includes a surface point contacted by the tail surface, where the surface point is most distal of all points on the pin away from the grommet in the longitudinal direction.

5. The fastener of claim 3, wherein the pin is positioned for axial rotation in any of the first, second and third positions.

6. The fastener of claim 1, wherein the first and third beveled surfaces are of different angles relative to the longitudinal direction.

7. The fastener of claim 1, wherein the first shoulder further includes a first end surface defined between the first and second beveled surfaces.

8. The fastener of claim 1, wherein the second shoulder further includes a second end surface defined between the third and fourth beveled surfaces.

9. The fastener of claim 1, wherein the second and third beveled surfaces together define a first neck to receive a part of the leg portion at the first operating position.

10. The fastener of claim 1, wherein the fourth beveled surface and the tail portion together define a second neck to receive a part of the leg portion at the second operating position.

11. The fastener of claim 1, wherein the first beveled surface is more parallel to the longitudinal direction than the third beveled surface.

12. A fastener extending along a longitudinal direction, comprising:
   a grommet including a leg portion which ends with a toe portion; and
   a pin including a head portion, a tail portion and a body portion, the body portion including a first shoulder defined by first and second beveled surfaces and a second shoulder defined by third and fourth beveled surfaces, wherein the third beveled surface is positioned between the second and fourth beveled surfaces along the longitudinal direction, and the second beveled surface is less parallel to the longitudinal direction than the fourth beveled surface, and wherein the second and third beveled surfaces further define there between a first neck, and the fourth beveled surface and the tail portion further define there between a second neck.

13. The fastener of claim 12, wherein the first and third beveled surfaces are of different angles relative to the longitudinal direction.

14. The fastener of claim 12, wherein the first and second shoulders further include a first end surface defined between the first and second beveled surfaces and a second end surface defined between the third and fourth beveled surfaces, respectively.

15. The fastener of claim 12, wherein the first beveled surface is more parallel to the longitudinal direction than the third beveled surface.

16. The fastener of claim 12, wherein the pin is positioned for axial rotation while the body portion thereof contacts the leg portion of the grommet.

17. A fastener extending along a longitudinal direction, comprising:
 a grommet including a leg portion which ends with a toe portion; and
 a pin including a head portion, a tail portion and a body portion, the head and tail portions each having an outer circumference greater than a maximum outer circumference of the body portion, the body portion including a first shoulder defined by first and second beveled surfaces and a first end surface positioned there between, and a second shoulder defined by third and fourth beveled surfaces and a second end surface positioned there between, the first and third beveled surfaces being of different angles relative to the longitudinal direction, wherein the third beveled surface is positioned between the second and fourth beveled surfaces along the longitudinal direction, and the second beveled surface is less parallel to the longitudinal direction than the fourth beveled surface.

18. The fastener of claim 17, wherein the first beveled surface is more parallel to the longitudinal direction than the third beveled surface.

19. The fastener of claim 17, wherein the pin is positioned for axial rotation while the body portion thereof contacts the leg portion of the grommet.

\* \* \* \* \*